(12) United States Patent
Zhang et al.

(10) Patent No.: US 7,707,184 B1
(45) Date of Patent: Apr. 27, 2010

(54) SYSTEM AND METHOD FOR SNAPSHOT FULL BACKUP AND HARD RECOVERY OF A DATABASE

(75) Inventors: Qing Zhang, Mountain View, CA (US); Michael D. Mankovsky, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 706 days.

(21) Appl. No.: 10/267,971

(22) Filed: Oct. 9, 2002

(51) Int. Cl.
*G06F 7/00* (2006.01)

(52) U.S. Cl. ........................ 707/645; 707/648
(58) Field of Classification Search ............... 707/1–10, 707/200–205, 640, 648; 711/161–162; 714/1, 714/15, 20, 5; 709/223, 224; 717/169
See application file for complete search history.

(56) References Cited

U.S. PATENT DOCUMENTS

| | | | |
|---|---|---|---|
| 4,570,217 A | 2/1986 | Allen et al. | |
| 5,163,131 A | 11/1992 | Row et al. | |
| 5,202,979 A | 4/1993 | Hillis et al. | |
| 5,278,979 A | 1/1994 | Foster et al. | |
| 5,355,453 A | 10/1994 | Row et al. | |
| 5,485,579 A | 1/1996 | Hitz et al. | |
| 5,504,883 A * | 4/1996 | Coverston et al. | 707/202 |
| 5,724,581 A * | 3/1998 | Kozakura | 707/202 |
| 5,802,366 A | 9/1998 | Row et al. | |
| 5,819,292 A | 10/1998 | Hitz et al. | |
| 5,835,953 A * | 11/1998 | Ohran | 711/162 |
| 5,923,833 A * | 7/1999 | Freund et al. | 714/19 |
| 5,931,918 A | 8/1999 | Row et al. | |
| 5,941,972 A | 8/1999 | Hoese et al. | |
| 5,963,962 A | 10/1999 | Hitz et al. | |
| 6,038,570 A | 3/2000 | Hitz et al. | |
| 6,065,037 A | 5/2000 | Hitz et al. | |
| 6,144,999 A * | 11/2000 | Khalidi et al. | 709/219 |
| 6,163,856 A * | 12/2000 | Dion et al. | 714/4 |
| 6,173,293 B1 * | 1/2001 | Thekkath et al. | 707/201 |
| 6,223,269 B1 * | 4/2001 | Blumenau | 711/202 |
| 6,374,267 B1 * | 4/2002 | Tam | 707/204 |
| 6,425,035 B2 | 7/2002 | Hoese et al. | |
| 6,434,681 B1 * | 8/2002 | Armangau | 711/162 |
| 6,449,623 B1 * | 9/2002 | Bohannon et al. | 707/202 |
| 6,453,325 B1 * | 9/2002 | Cabrera et al. | 707/204 |
| 6,490,666 B1 * | 12/2002 | Cabrera et al. | 711/161 |
| 6,507,853 B2 * | 1/2003 | Bamford et al. | 707/203 |
| 6,557,024 B1 * | 4/2003 | Saito et al. | 709/201 |
| 6,631,477 B1 * | 10/2003 | LeCrone et al. | 714/5 |
| 6,662,198 B2 * | 12/2003 | Satyanarayanan et al. | 707/204 |

(Continued)

OTHER PUBLICATIONS

U.S. Appl. No. 09/932,578, filed Jun. 27, 2002, Blake Lewis et al.

(Continued)

*Primary Examiner*—Miranda Le
(74) *Attorney, Agent, or Firm*—Cesari and McKenna, LLP

(57) ABSTRACT

The present invention provides a method for generating a backup of a database file that is suitable for a hard recovery operation. A snapshot of the database file is generated and the log and/or patch files associated with the database are stored in a backup location. Additionally, the header and/or footer information of the database is stored, thereby enabling a restored snapshot of the database to be converted into a file suitable for a hard recovery operation.

19 Claims, 12 Drawing Sheets

U.S. PATENT DOCUMENTS

| | | | |
|---|---|---|---|
| 6,665,815 B1* | 12/2003 | Goldstein et al. | 714/20 |
| 6,684,225 B1* | 1/2004 | Huras et al. | 707/202 |
| 6,684,229 B1* | 1/2004 | Luong et al. | 707/204 |
| 6,694,413 B1* | 2/2004 | Mimatsu et al. | 711/162 |
| 6,708,130 B1* | 3/2004 | Yamazaki et al. | 702/82 |
| 6,728,747 B1* | 4/2004 | Jenkins et al. | 718/101 |
| 6,728,879 B1* | 4/2004 | Atkinson | 713/168 |
| 6,732,123 B1* | 5/2004 | Moore et al. | 707/202 |
| 6,732,124 B1* | 5/2004 | Koseki et al. | 707/202 |
| 6,769,074 B2* | 7/2004 | Vaitzblit | 714/16 |
| 6,799,189 B2* | 9/2004 | Huxoll | 707/204 |
| 6,820,214 B1* | 11/2004 | Cabrera et al. | 714/15 |
| 6,829,617 B2* | 12/2004 | Sawdon et al. | 707/102 |
| 6,847,982 B2* | 1/2005 | Parker et al. | 707/200 |
| 6,877,109 B2* | 4/2005 | Delaney et al. | 714/6 |
| 6,938,134 B2* | 8/2005 | Madany | 711/161 |
| 6,948,089 B2* | 9/2005 | Fujibayashi | 714/6 |
| 6,957,221 B1* | 10/2005 | Hart et al. | 707/100 |
| 6,959,310 B2* | 10/2005 | Eshel et al. | 707/200 |
| 6,978,279 B1* | 12/2005 | Lomet et al. | 707/202 |
| 7,039,827 B2* | 5/2006 | Meyer et al. | 714/4 |
| 7,043,503 B2* | 5/2006 | Haskin et al. | 707/200 |
| 7,054,890 B2* | 5/2006 | Musante et al. | 707/201 |
| 7,054,891 B2* | 5/2006 | Cole | 707/201 |
| 7,065,674 B2* | 6/2006 | Cabrera et al. | 714/16 |
| 7,099,900 B1* | 8/2006 | Bromley et al. | 707/204 |
| 2001/0056438 A1* | 12/2001 | Ito | |
| 2002/0069324 A1* | 6/2002 | Gerasimov et al. | 711/114 |
| 2002/0091718 A1* | 7/2002 | Bohannon et al. | 707/202 |
| 2003/0018878 A1* | 1/2003 | Dorward et al. | 711/216 |
| 2003/0028736 A1* | 2/2003 | Berkowitz et al. | |
| 2003/0093444 A1* | 5/2003 | Huxoll | 707/204 |
| 2003/0101321 A1* | 5/2003 | Ohran | 711/162 |
| 2003/0126247 A1* | 7/2003 | Strasser et al. | 709/223 |
| 2003/0236956 A1* | 12/2003 | Grubbs et al. | 711/162 |
| 2004/0030727 A1* | 2/2004 | Armangau et al. | 707/200 |
| 2004/0030951 A1* | 2/2004 | Armangau | 714/6 |
| 2004/0205663 A1* | 10/2004 | Mohamed | 715/530 |

OTHER PUBLICATIONS

U.S. Appl. No. 10/090,963, Dennis E. Chapman.
U.S. Appl. No. 10/100,948, Raymond C. Chen et al.
David Hitz et al. TR3002 File System Design for a NFS File Server Appliance published by Network Appliance, Inc.
Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.
Fielding et al. (1999) Request for Comments (RFC) 2616, HTTP/1.1.
Microsoft Knowledge Base Article—296788. XADM: Offline Backup and Restoration Procedures for Exchange 2000 Server.
Akyurek, Sedat, *Placing Replicated Data to Reduce Seek Delays*, Department of Computer Science, University of Maryland, UMIACS-TR-91-121, CS-TR-2746, Aug. 1991.
Bitton, Dina, *Disk Shadowing*, Proceedings of the 14th VLDB Conference, LA, CA 1988.
Chaudhuri, Surajit, et al., *Self-Tuning Technology in Microsoft SQL Server*, Data Engineering Journal 22, Feb. 1999 pp. 20-27.
Chutani, Sailesh, et al., *The Episode File System*, In Proceedings of the USENIX Winter 1992.
Coyne, Robert A., et al., *Storage Systems for National Information Assets*, Proc. Supercomputing 92, Minneapolis, Nov. 1992, pp. 626-633.
Finlayson, Ross S., et al., *Log Files: An Extended File Service Exploiting Write-Once Storage* Department of Computer Science, Stanford University, Report No. STAN-CS-87-1177, Sep. 1987.
Gray, Jim, et al., *The Recovery Manager of the System R Database Manager*, ACM Computing Surveys, (13)2:223-242 1981.
Hecht, Matthew S., et al. *Shadowed Management of Free Disk Pages with a Linked List*, ACM Transactions on Database Systems, 8/4, Dec. 1983, pp. 503-514.
Howard, John, H. et al., *Scale and Performance in a Distributed File System*, Carnegie Mellon University, CMU-ITC-87-068, Aug. 1987.
Howard, John H., *An Overview of the Andrew File System*, Carnegie Mellon University, CMU-ITC-88-062 1988.
Howard, John, H. et al., *Scale and Performance in a Distributed File System*, ACM Trans. Computer System, 6(1), Feb. 1988 pp. 51-81.
Kazar, Michael Leon, *Synchronization and Caching Issues in the Andrew File System*, Carnegie Mellon University, CMU-ITC-88-063.
Kazar, Michael L., et al., *DEcorum File System Architectural Overview*, USENIX Summer Conference, Anaheim, California, 1990.
Kemper, Alfons, et al., *Performance Tuning for SAP R/3*, Data Engineering Journal 22, Feb. 1999 pp. 33-40.
Kent, Jack et al., *Optimizing Shadow Recovery Algorithms*, IEEE Transactions on Software Engineering, 14(2): 155-168, Feb. 1988.
Kistler, et al., *Disconnected Operation in the Coda File System*, ACM Transactions on Computer Systems, vol. 10, No. 1, Feb. 1992, pp. 3-25.
Lorie, Raymond, A. *Physical Integrity in a Large Segmented Database*, ACM Trans. Database Syst., vol. 2, Mar. 1977, pp. 91-104.
Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.
Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.
Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 Sep. 1988.
Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.
Quinlan, Sean, *A Cached WORM File System*, Software-Practice and Experience, 21(12):1289-1299 1991.
Rosenblum, Mendel, et al., *The LFS Storage Manager*, Computer Science Division, Electrical-Engineering And Computer Sciences, Univ. of CA, presented at Summer '90 USENIX Technical Conference, Anaheim, CA Jun. 1990.
Rosenblum, Mendel, et al. *The Design and Implementation of a Log-Structured File System* Jul. 24, 1991 pp. 1-15.
Rosenblum, Mendel, *The Design and Implementation of a Log-Structured File System*, 1992 pp. 1-93.
Rosenblum, Mendel, et al., *The Design and Implementation of a Log-Structured File System*, In Proceedings of ACM Transactions on Computer Systems, (10)1:26-52, Feb. 1992.
Schiefer, Berni, et al., *DB2 Universal Database Performance Tuning*, Data Engineering Journal 22, Feb. 1999 pp. 12-19.
Seltzer, Margo I., et al., *Journaling Versus Soft Updates: Asynchronous Meta-Data Protection in File Systems*, Proceedings of 200 USENIX Annual Technical Conference, Jun. 18-23, 2000.
Shasha, Dennis, *Tuning Time Series Queries in Finance: Case Studies and Recommendations*, Data Engineering Journal 22, Feb. 1999 pp. 41-47.
Sidebotham, Bob, *Volumes: The Andrew File System Data Structuring Primitive*, EEUG Conference Proceedings, Manchester, UK, Autumn 1986.
Subramanian, Muralidhar, et al., *Performance Challenges in Object-Relational DBMSs*, Data Engineering Journal 22, Feb. 1999 pp. 28-32.
Weikum, Gerhard, et al., *Towards Self-Tuning Memory Management for Data Servers*, Data Engineering Journal 22, Feb. 1999 pp. 3-11.
West, Michael, et al. *The ITC Distributed File System: Prototype and Experience*, Carnegie-Mellon University, Technical Report CMU-ITC-040, Mar. 1985.
Zayas, Edward R., AFS-3 Programmer's Reference: Architectural Overview, Transarc Corporation, Pittsburgh, PA, 1.0 edition 1991.

* cited by examiner

SYSTEM AND METHOD FOR SNAPSHOT FULL BACKUP AND HARD RECOVERY OF A DATABASE

FIELD OF THE INVENTION

The present invention relates to databases and, more particularly performing a hard recovery of a database.

BACKGROUND OF THE INVENTION

Microsoft® Exchange is a messaging and collaboration software system that provides a variety of applications for group interaction using networked computer systems. Specifically, Microsoft Exchange (by Microsoft Corp. of Redmond, Wash.) provides support for a database server to support remotely connected clients over various networks. An Exchange server can run on a variety of operating systems including, for example, the Microsoft Windows NT® or Microsoft Windows® 2000 operating systems.

The Microsoft Exchange 2000 database server permits up to 20 databases to be utilized, divided into four storage groups of up to five databases each. In a typical configuration, Microsoft Exchange stores data associated with a given database in two files. In the particular example of Microsoft Exchange 2000, these two files are a properties data file (designated by an .edb file extension) and a streaming data file (designated by an .stm file extension). However, it is contemplated that other versions support different database structures. The default storage locations for these databases are on a disk locally connected to the computer on which the Exchange software is running.

In the exemplary Exchange 2000 server configuration, the .edb file is a conventional Exchange database file. The .stm file is a streaming data file that contains raw content that has been received via, for example, the Internet and is stored in its native format. Pointers are created by the Exchange server within the .edb file to point to various messages or data within the .stm file.

FIG. 1 shows an exemplary flow chart of data passing through an Exchange server. In step 105, the data that is generated by a client of the Exchange server is a transaction. This may be, for example, email messages and associated attachments created by an email client, such as Microsoft Outlook. Next, in step 110, the transaction is stored in the memory of the server. The storage of the transaction in memory is often transient in nature until the message is committed to some form on nonvolatile storage. The transaction is then written to a log file in step 115. The log files typically have a pre-allocated size. In one known example, each log file is 5 megabytes (MB) in size. In an illustrative embodiment, Microsoft Exchange requires that the most recent log file be named "e0n.log" where n may be a value in the range of 0-3 representing up to four storage groups. Each preceding log file is named "e0nXXXXX.log." The "XXXXX" is a numerical identifier associated with the particular log file. Thus, an Exchange server may have a variable number of log files at any given point-in-time, depending on how many log files have been incorporated into the database files. As a further step, the transaction that is written to the log file is also written from system memory to the database file (step 120). The writing of the transactions to database occurs in a lazy write fashion. By "lazy write" it is meant a writing process or procedure of the Exchange software that performs the write when central processing unit cycles are available.

FIG. 2 is a schematic block diagram of an exemplary Exchange server environment 200. An exemplary server 205 executing the Windows® 2000 Advanced Server operating system containing a local disk 210 is shown connected to a backup tape drive 220 and an external disk 215. The external tape drive 220 is connected via either a small computer system interface (SCSI) connection or a switching network, such as a storage area network (SAN). Similarly, the external disks 215 may be connected via a SAN or other suitable networking architectures. The Exchange server 205 may be incorporated into a Microsoft Clustering System (MSCS) environment 225. Such a clustering environment provides for redundant data program access to clients.

In known examples of Exchange servers, the Exchange software provides an application program interface (API) that is accessible by other programs executing on the server for performing backup and restore operations on the various databases. Other applications or processes executing on the server can access these APIs to perform various backup/restore operations. These API's are targeted toward the use of a tape drive as a backup storage device. Such backup operations are normally performed while the Exchange server is operating. As tape drives typically have a slower read/write time than disk drives, the backup of databases with a tape device can consume a significant amount of time. While the Exchange server continues to service requests during a backup operation, performance is degraded during the course of the backup operation. Because of this and because tape devices require significant time to perform a backup, such backups are typically performed at night (or other off-peak time), when few users are utilizing the system. Similarly, a database restore operation using a tape device consumes a substantial amount of time, also causing concurrent system degradation. When performing a backup or restore operation, the database files and any unincorporated log must be saved and/or restored. Thus as the size of the various database files increases, the time required to perform a backup/restore operation to a tape device also increases.

In a further known example, the Exchange server is adapted to have the database and log files preferably written to a local disk. However, by utilizing other software products such as, e.g. SnapManager® for Microsoft Exchange 5.5 available from Network Appliance, Inc. of Sunnyvale, Calif., the log files and databases may be written to disks that are remotely connected to the Exchange server. In one known implementation, the Exchange server is operatively interconnected with a file server and associated disk arrays, which provides file service for storage and access of the database and log files.

A file server is a computer that provides file service relating to the organization of information on storage devices, such as disks. The file server or filer includes a storage operating system that manages data access and may implement a file system to logically organize the information as a hierarchical structure of directories and files on the disks. By "file system" it is meant generally a structuring of data and metadata on a storage device, such as disks, which permits reading/writing of data on those disks. A file system also includes mechanisms for performing these operations. Each "on-disk" file may be implemented as a set of disk blocks configured to store information, such as text, whereas the directory may be implemented as a specially-formatted file in which information about other files and directories are stored. A filer may be configured to operate according to a client/server model of information delivery to thereby allow many clients to access files stored on a server, e.g., the filer. In this model, the client may comprise an application, such as a file system protocol, executing on a computer that "connects" to the filer over a computer network, such as a point-to-point link, shared local area network (LAN), wide area network (WAN), Storage Area Network (SAN) or virtual private network (VPN) implemented over a public network such as the Internet. Each client may request the services of the filer by issuing file system protocol messages (in the form of packets) to the filer over the network.

A common type of file system is a "write in-place" file system, an example of which is the conventional Berkeley fast file system. In a write in-place file system, the locations of the data structures, such as inodes and data blocks, on disk are typically fixed. An inode is a data structure used to store information, such as meta-data, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the Write Anywhere File Layout (WAFL™) file system also available from Network Appliance, Inc. of Sunnyvale, Calif. The WAFL™ file system is implemented within a microkernel as part of the overall protocol stack of the filer and associated disk storage. This microkernel is supplied as part of Network Appliance's Data ONTAP™ storage operating system, residing on the filer, that processes file-service requests from network-attached clients.

As used herein, the term "storage operating system" generally refers to the computer-executable code operable on a storage system that manages data access and may implement file system semantics. In this sense, Data ONTAP™ software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. In the example of a WAFL-based file system, a RAID 4 implementation is advantageously employed. This implementation specifically entails the striping of data across a group of disks, and separate parity caching within a selected disk of the RAID group. As described herein, a volume typically comprises at least one data disk and one associated parity disk (or possibly data/parity) partitions in a single disk) arranged according to a RAID 4, or equivalent high-reliability, implementation.

A file server, as described above may be interconnected by a network to an Exchange or other database server to provide file service operations. In the example of an Exchange database server, the various database files can be stored on a set of disks interconnected with a file server through the use of such software programs as the above-described SnapManager software. As noted, such file servers typically utilize a tape device for backup/restore operations. A substantial amount of time and system resources are required to perform a backup operation to a tape device. Consequently, many system administrators do not frequently perform backup operations, to avoid the concomitant system performance degradation.

When a database or other file becomes corrupted, the administrator may desire to restore the file using a previously generated backup image of the file. Using conventional tape-based restore operations, an administrator would take the database server offline and then copy the restored database files to the active file system. This copying could take a substantial amount of time (on the order of hours) depending upon the size of the restored database file. Depending upon the methodology used in generating a backup of the file, a hard or soft recovery procedure could be utilized.

There are known methods for performing a soft recovery of an Exchange database. A soft recovery is employed when an Exchanger server is taken offline and then reinitialized. Upon restart, the Exchange server replaces transaction logs to bring the database to a current and consistent state. One example of a soft recovery is described in U.S. patent application Ser. No. 10/090,963, entitled SYSTEM AND METHOD FOR CREATING A POINT-IN-TIME RESTORATION OF A DATABASE FILE, by Dennis E. Chapman, the contents of which are hereby incorporated by reference.

However, soft recovery is not an appropriate method to restore databases being served by a database server that is handling multiple databases. Significant advantages in reliability, scalability and flexibility are realized by having a single database server manage multiple databases. Specifically, the other databases being managed by a database server will be able to remain online when one database needs to be recovered. In the example of Exchange 2000, which supports multiple storage groups and multiple databases per storage group, a hard recovery is the preferred recovery method.

A hard recovery is the act of restoring the server from an initial or empty state. The database is restored from a backup and all transaction logs are replayed. During a hard recovery, the database server reconstructs the database from a backup data file. However, while the online backup was being created, often there will be transactions that are received by the server between the time the database is written to the backup location and the time that the backup finishes. These additional transactions are stored in patch files. When executing a hard recovery, these patch files are also added to the database so that the recovery is complete. Patch files are no longer utilized with Exchange 2000 servers running Service Pack 2 (SP2) or higher. However, many installations are in service that are not utilizing SP2.

A noted disadvantage of hard recovery operations is that they are typically performed from a backup stored on a tape device. By utilizing a tape device for backup operations, system performance is degraded and the time required for the backup operation is substantially longer than for soft recovery operations utilizing a snapshotting file system. Thus, it is an object of the present invention to provide a system and method for performing a backup and restore operation utilizing a hard recovery procedure for a database.

SUMMARY OF THE INVENTION

The disadvantages of the prior art are overcome by providing a system and method for performing an online hard recovery of a database using a snapshot, defined further below, of the database. When generating a backup, a snapshot is taken of the database files. Additionally, the header and/or footer information associated with the particular point and time of the backup of the database is stored in a separate file. The associated log and/or patch files for the database are copied to a special backup directory. The snapshots can be taken in a matter of seconds, thereby allowing multiple backups per day to be created of the database files.

If the database files become corrupted, the user or administrator may begin a hard restore procedure. The various backed-up log files are verified and then copied from the backup location to the active file system. The database files are restored from the snapshot to the active file system. The backup agent then causes the database server to initiate a hard recovery operation.

The appropriate log file also copied from the backup location to the active file system. Once all the backup files are in the active file system, the backup agent alerts the database server to begin a hard recovery process. The database server then utilizes the restored backup file (with modified header and footer), the log and/or patch files to generate a fully consistent database.

In one embodiment, the verification of the transaction log ensures that there are any missing log files and that the log files created after a given backup are consistent with is those stored in the backup.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

A. Network Environment

Figure 1:
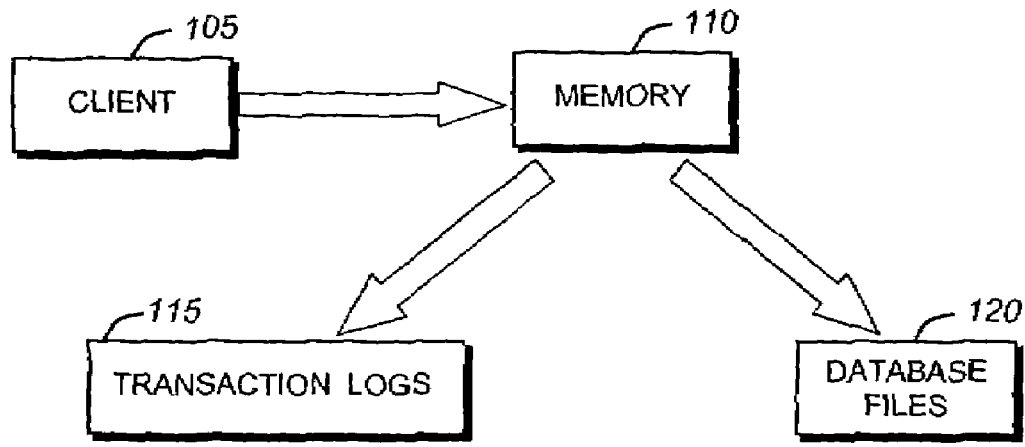
FIG. 1, already described, is a flow chart detailing the steps that an electronic message follows in accordance with an Exchange server according to the prior art.
Figure 2:
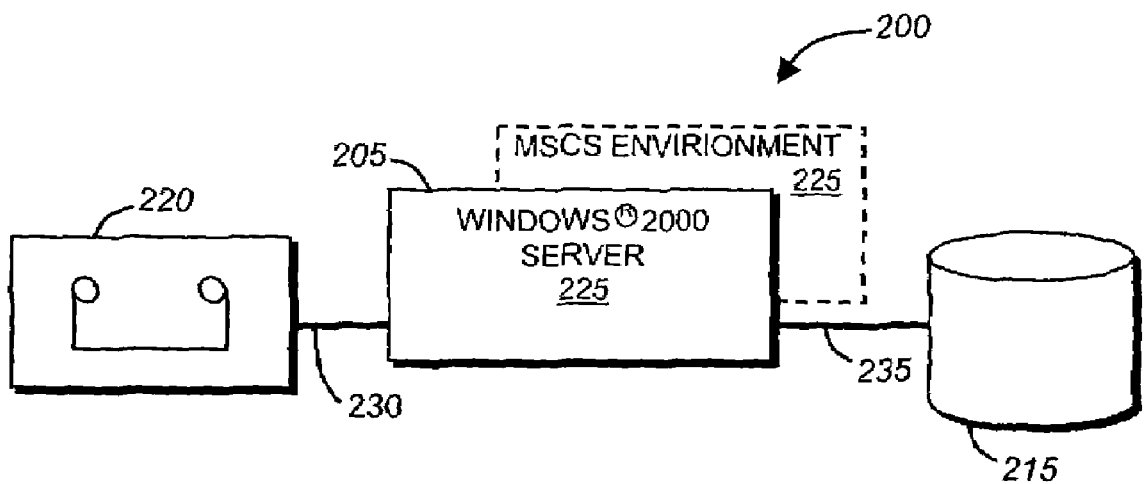
FIG. 2, already described, is a schematic block diagram of an exemplary Microsoft® NT server executing Exchange having an external disk and tape drive according to the prior art.
Figure 3:
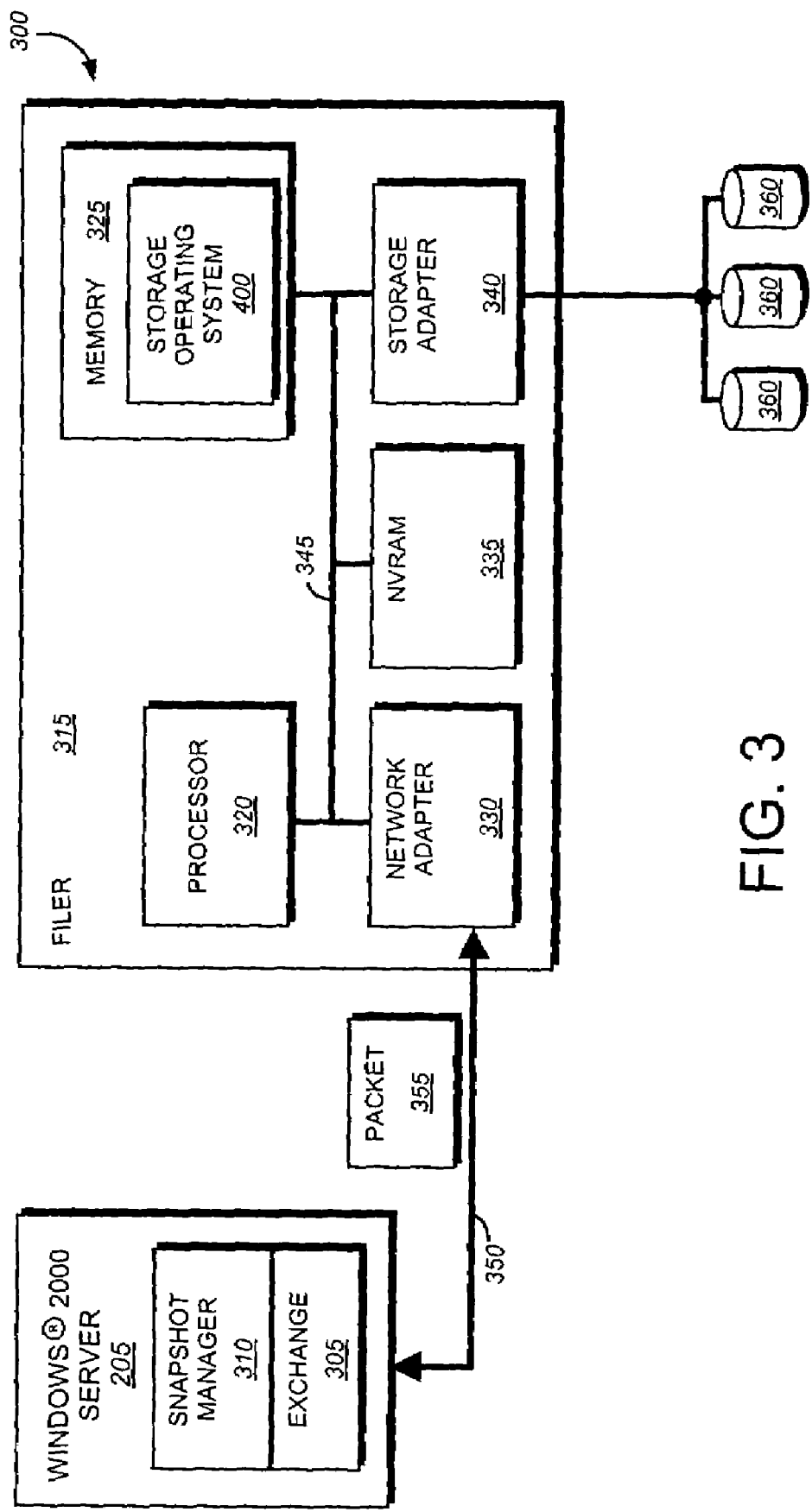
FIG. 3 is a schematic block diagram of an exemplary Exchange server and file server in accordance with an illustrative embodiment of this invention.

By way of further background, FIG. 3 is a schematic block diagram of an exemplary storage system environment 300 that includes a Windows 2000 server 205 having one or more applications, including a Microsoft Exchange server 305 and a snapshot manager 310, and an interconnected file server 315 that may be advantageously used with the present invention. The snapshot manager 310 is a general-purpose application that handles snapshot creation and handling functions within the server. One example is the above-referenced Network Appliance SnapManager software. The snapshotting process is described in further detail below and in U.S. patent application Ser. No. 09/932,578, entitled INSTANT SNAPSHOT by Lewis et al., are hereby incorporated by reference.

The filer server or "filer" 315 is a computer that provides file service relating to the organization of information on storage devices, such as disks 360. The filer 315 comprises a processor 320, a memory 325, a network adapter 330 and a storage adapter 340 interconnected by a system bus 345. The filer 315 also includes a storage operating system 400 (FIG. 4) that may implement a file system to logically organize the information as a hierarchical structure of directories and files on the disks.

It will be understood to those skilled in the art that the inventive technique described herein may apply to any type of special-purpose computer (e.g., file serving appliance) or general-purpose computer, including a standalone computer, embodied as a storage system. To that end, filer 315 can be broadly, and alternatively, referred to as storage system. Moreover, the teachings of this invention can be adapted to a variety of storage system architectures including, but not limited to, a network-attached storage environment, a storage area network and disk assembly directly-attached to a client/ host computer. The term "storage system" should, therefore, be taken broadly to include such arrangements.

In the illustrative embodiment, the memory 325 comprises storage locations that are addressable by the processor and adapters for storing software program code. The memory comprises a form of random access memory (RAM) that is generally cleared by a power cycle or other reboot operation (e.g., it is a "volatile" memory). The processor and adapters may, in turn, comprise processing elements and/or logic circuitry configured to execute the software code and manipulate the data structures. The operating system 400, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 330 comprises the mechanical, electrical and signaling circuitry needed to connect the filer 315 to an Exchange or database server 205 over a computer network 350, which may comprise a point-to-point connection or a shared medium, such as a local area network or storage area network. The database server 205 may be a general-purpose computer configured to execute applications 305, such as a database application, for example Exchange. Moreover, the client may interact with the filer 315 in accordance with a client/server model of information delivery. That is, the client may request the services of the filer, and the filer may return the results of the services requested by the client, by exchanging packets 355 encapsulating, e.g., the NFS, CIFS, FCP, or iSCSI protocol format over the network 350.

The storage adapter 340 cooperates with the storage operating system 400 (FIG. 4) executing on the filer to access information requested by the client. The information may be stored on the disks 360 that are attached, via the storage adapter 340 to the filer 315 or other node of a storage system as defined herein. The storage adapter 340 includes input/output (I/O) interface circuitry that couples to the disks over an I/O interconnect arrangement, such as a conventional high-performance, Fibre Channel serial link topology. The information is retrieved by the storage adapter and, if necessary, processed by the processor 320 (or the adapter 340 itself) prior to being forwarded over the system bus 345 to the network adapter 330, where the information is formatted into a packet and returned to the server 205.

In one exemplary filer implementation, the filer 315 can include a nonvolatile random access memory (NVRAM) 335 that provides fault-tolerant backup of data, enabling the integrity of filer transactions to survive a service interruption based upon a power failure, or other fault. The size of the NVRAM depends in part upon its implementation and function in the file server. It is typically sized sufficiently to log a certain time-based chunk of transactions (for example, several seconds worth). The NVRAM is filled after each client request is completed, but before the result of the request is returned to the requesting client.

In an illustrative embodiment, the disks 360 are arranged into a plurality of volumes, each having a file system associated therewith. The volumes each include one or more disks 360. In one embodiment, the physical disks 360 are configured into RAID groups so that some disks store striped data and some disks store separate parity for the data, in accordance with a preferred RAID 4 configuration. However, other configurations (e.g. RAID 5 having distributed parity across stripes) are also contemplated. In this embodiment, a minimum of one parity disk and one data disk is employed. However, a typical implementation may include three data and one parity disk per RAID group, and a multiplicity of RAID groups per volume.

B. Storage Operating System

Figure 4:
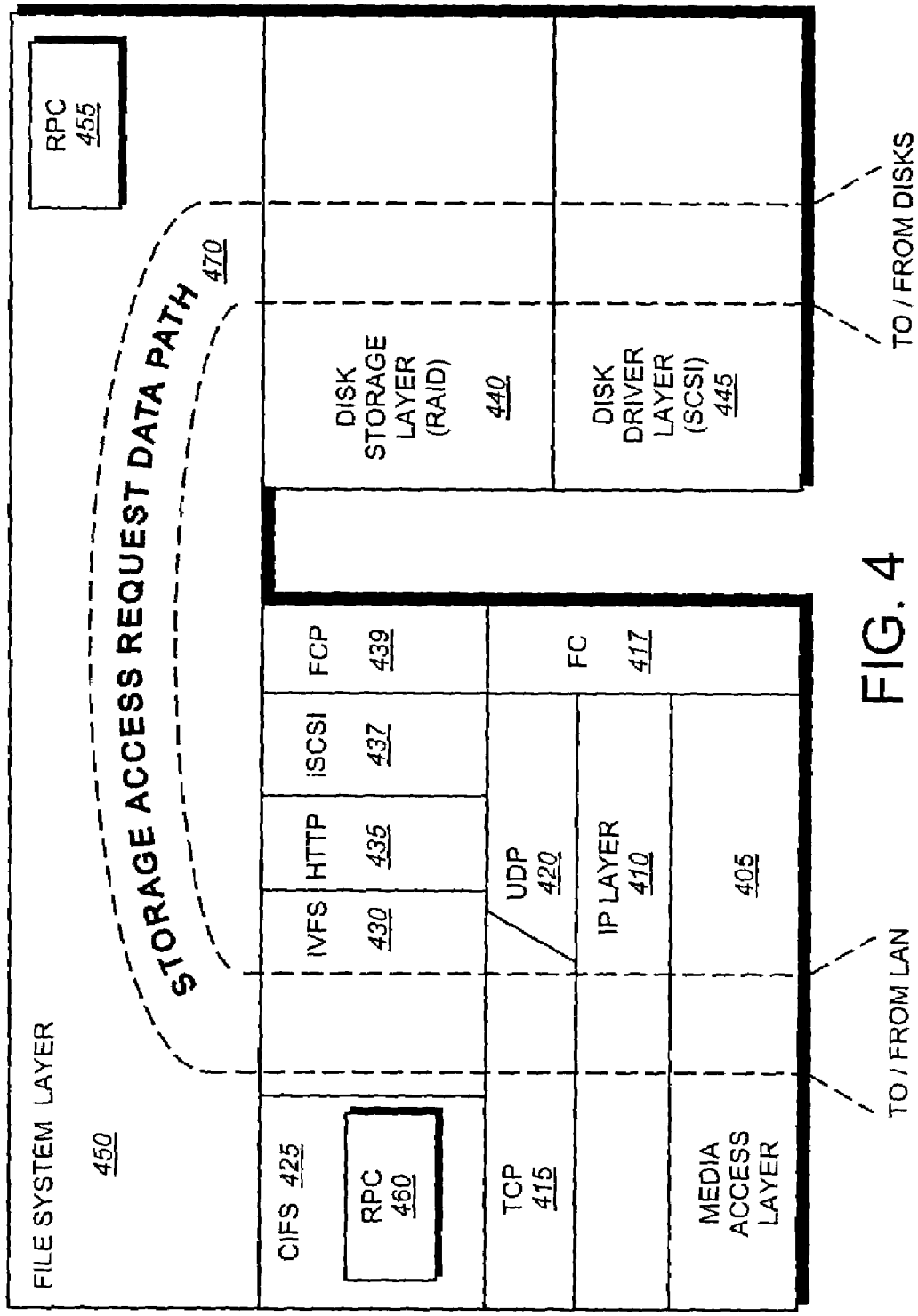
FIG. 4 is a schematic block diagram of an exemplary storage operating system for use on the file server of FIG. 3.

The organization of the preferred storage operating system for the exemplary filer is now described briefly. However, it is expressly contemplated that the principles of this invention can be implemented using a variety of alternate storage operating system architectures. As shown in FIG. 4, the storage operating system 400 comprises a series of software layers, including a media access layer 405 of network drivers (e.g., an Ethernet driver). The operating system further includes network protocol layers, such as the Internet Protocol (IP) layer 410 and its supporting transport mechanisms, the Transport Control Protocol (TCP) layer 415 and the User Datagram Protocol (UDP) layer 420. A file system protocol layer provides multi-protocol data access and, to that end, includes support for the Common Internet File System (CIFS) protocol 425, the (NFS) protocol 430 and the Hypertext Transfer Protocol (HTTP) protocol 435. The CIFS layer 425 includes support for remote procedure calls (RPC) 460. RPCs permit an application executing on another computer to remotely call various functions via a CIFS data packet. Such remote functions, described further below, include e.g., enabling a client of the filer to take a snapshot of a file system of a volume. The storage operating system also includes support for the iSCSI protocol 437. Additionally, the filer may support SCSI encapsulated in Fibre Channel (FCP) 439. The FCP layer 439 operates with a Fibre Channel (FC) 417 layer.

In addition, the storage operating system 400 includes a disk storage layer 440 that implements a disk storage protocol, such as a RAID protocol, and a disk driver layer 445, that implements a disk control protocol such as the small computer system interface (SCSI).

Bridging the disk software layers with the network and file system protocol layers is a file system layer 450 of the storage operating system 400. Generally, the layer 450 implements a file system having an on-disk format representation that is block-based using, e.g., 4-kilobyte (KB) data blocks and using inodes to describe the files. In response to transaction requests, the file system generates operations to load (retrieve) the requested data from volumes if it is not resident "in-core", i.e., in the filer's memory 325. If the information is not in memory, the file system layer 450 indexes into the inode file using the inode number to access an appropriate entry and retrieve a logical volume block number. The file system layer 450 then passes the logical volume block number to the disk storage (RAID) layer 440, which maps that logical number to a disk block number and sends the latter to an appropriate driver (for example, an encapsulation of SCSI implemented on a fibre channel disk interconnection) of the disk driver layer 445. The disk driver accesses the disk block number from volumes and loads the requested data in memory 325 for processing by the filer 315. Upon completion of the request, the filer (and storage operating system) returns a reply, e.g., a conventional acknowledgement packet 355 defined by the Common Internet File System (CIFS) specification, to the server 205 over the network 350. Similar to the CIFS layer 425, the file system layer 450 includes support for various remove procedure calls (RPC) 455.

It should be noted that the software "path" 470 through the storage operating system layers described above needed to perform data storage access for the client request received at the filer may alternatively be implemented in hardware or a combination of hardware and software. That is, in an alternate embodiment of the invention, the storage access request data path 470 may be implemented as logic circuitry embodied within a field programmable gate array (FPGA) or an application specific integrated circuit (ASIC). This type of hardware implementation increases the performance of the file service provided by filer 315 in response to a file system request packet 355 issued by the database server 205.

C. Snapshots

To be able to create effective backups of database files, the database files should be regularly backed up. As noted above, prior or other implementations typically only perform a backup operation during the evening (or other off-peak time) due to system performance degradation concerns caused by the backup operation. By storing the database files on a file server, faster backups can be accomplished using, e.g., a file server's inherent snapshot capabilities provided by the file system. By "snapshot" it is meant generally a rapid generation of an image of the data at a certain point-in-time. "Snapshot" is a trademark of Network Appliance, Inc. It is used for purposes of this patent to designate a persistent consistency point (CP) image. A persistent consistency point image (PCPI) is a point-in-time representation of the storage system, and more particularly, of the active file system, stored on a storage device (e.g., on disk) or another persistent memory having a name or other identifier that distinguishes it from other PCPIs taken at other points-in-time. A PCPI can also include other information (metadata) about the active file system at the particular point-in-time for which the image is taken. The terms "PCPI" and "snapshot" shall be used interchangeably throughout this patent and without derogation of Network Appliance's trademark rights. While this description is written in terms of the methodology utilized by the WAFL file system in generating Snapshots™, it is expressly contemplated that other methods of creating snapshots or other duplicated copies of the stored data regardless of the organization and structure can be utilized in accordance with the teachings of the present invention. Snapshots, described further below, can be generated using a variety of techniques. It should be noted that the teachings of the present invention will work with any technique for replicating the active file system, including, for example, mirrored arrays.

Figure 5A:
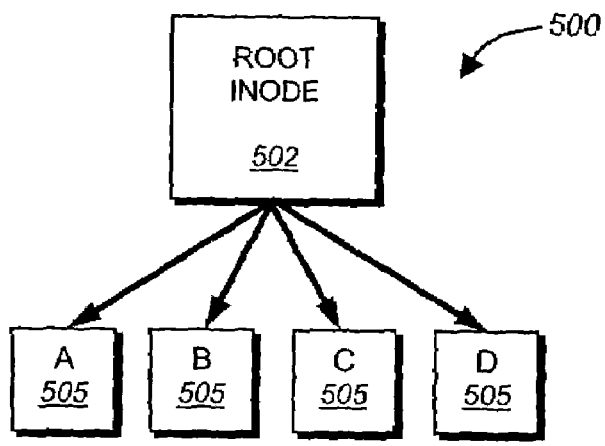
FIG. 5A is an exemplary file system structure showing a root inode and associated data inodes.
Figure 5B:
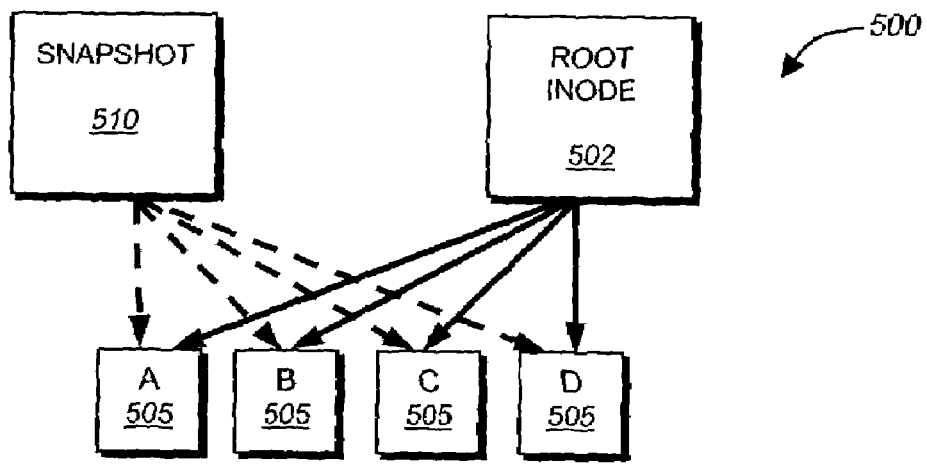
FIG. 5B is an exemplary file system data structure showing a snapshot inode created linking two instead of data inodes.
Figure 5C:
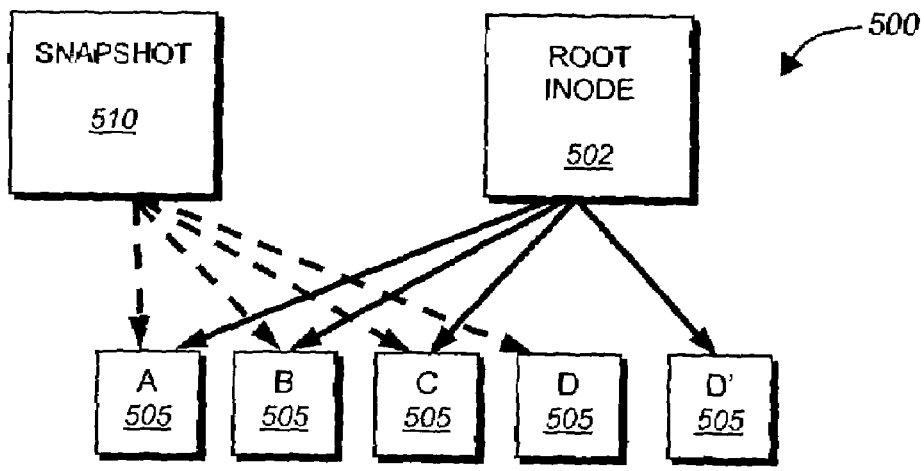
FIG. 5C is an exemplary data structure showing a snapshot and ripped inodes connected to a set of data inodes having modified a data.

Now describing the snapshot procedure briefly, FIG. 5A shows an exemplary root inode 502 of an active file system 500 linking four inodes 505. Note that the active file system would include additional data structures and blocks (not shown) such as a file system information block defining the root of the active file system. In accordance with the illustrative embodiment, the active file system 500 includes a root inode 502 linking to the various inodes 505 that contain the data associated with a file or directory. It should be noted that numerous intermediate inodes may be located between the root inode 502 and the data inodes 505. Each layer of intermediate inodes contains pointers to a lower level of inodes containing either additional pointers or data blocks. In FIG. 5B a conventional snapshot 510 has been taken of the root inode 502. As can be seen, the snapshot 610 includes a link to each of the inodes 505. FIG. 5C shows the snapshotted root inode after data inode D has been modified into D'. Thus, the snapshot 510 provides links to data inodes A-D, which represent the state of the data at the time of the snapshot. The root inode 502, which now represents the modified root inode, links to unmodified data inodes A-C and the modified inode D'.

Figure 6:
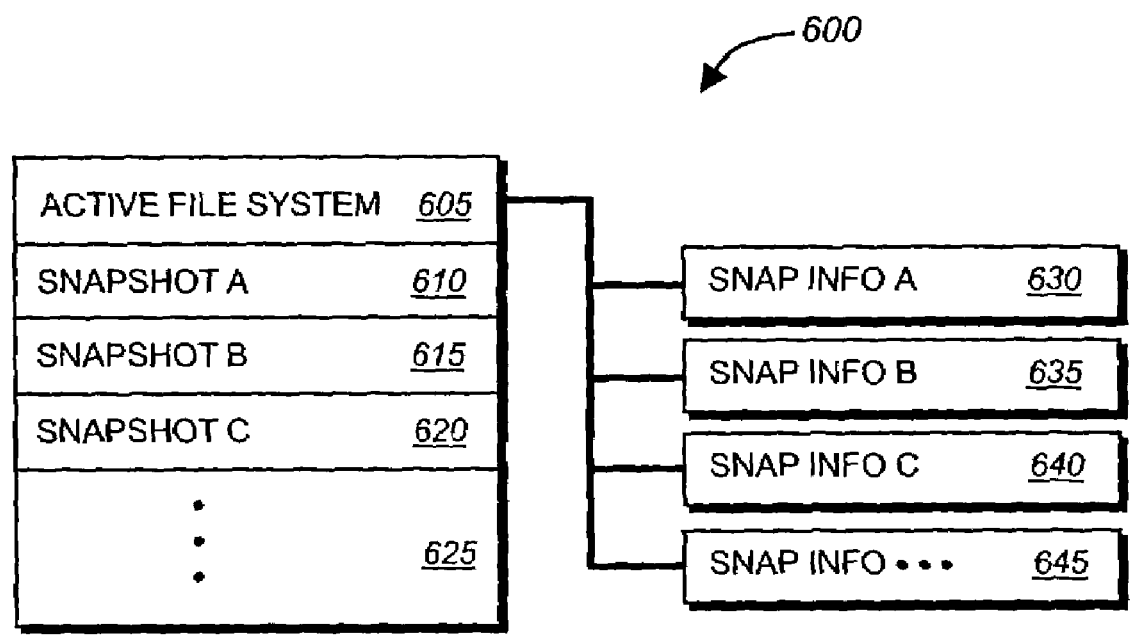
FIG. 6 is a block diagram of an active file system in associated snapshots.

FIG. 6 shows an exemplary active file system and associated snapshots. The active file system 605 is the file system to which data access operations are currently directed. Shown connected to the live file system are a series of snapshots, including snapshot A 610, snapshot B 615 and snapshot C 620. Additional snapshots 625 may also be connected with the active file system 605. Each of the snapshots 610-625, are the result of an above-described snapshot operation. In known implementations of storage operating systems, a number of time-ordered snapshots can be accommodated with respect to a file system. As part of the active file system 605, a number of snapinfos 630-645 are connected. Each snapinfo is associated with a corresponding snapshot of the file system or database files. The snapinfo carries metadata of the snapshot including, for example the time the snapshot was performed, the results of the snapshot and any log files generated from the snapshot. The snapinfo can be stored in the active file system 605, typically in a subdirectory or directory of the file system.

D. Backup Creation

In accordance with the present invention, a backup is generated of a database that can be utilized in a hard recovery process. The Microsoft Exchange 2000 database program is used herein for exemplary purposes only. The teachings of the present invention may be implemented in accordance with any suitable database system.

In the illustrative embodiment, a backup agent executes on a computer connected to the Exchange server. Alternatively, the backup agent may execute on the same computer serving as the Exchange server. The backup agent is an application program or process that manages the backup and recovery of the Exchange database in accordance with the present invention. Many commercially available backup agents may be utilized with the present invention, including, for example, the above-referenced Network Appliance's SnapManager for Exchange Product, available from Network Appliance, Inc. of Sunnyvale, Calif.

Figure 7:
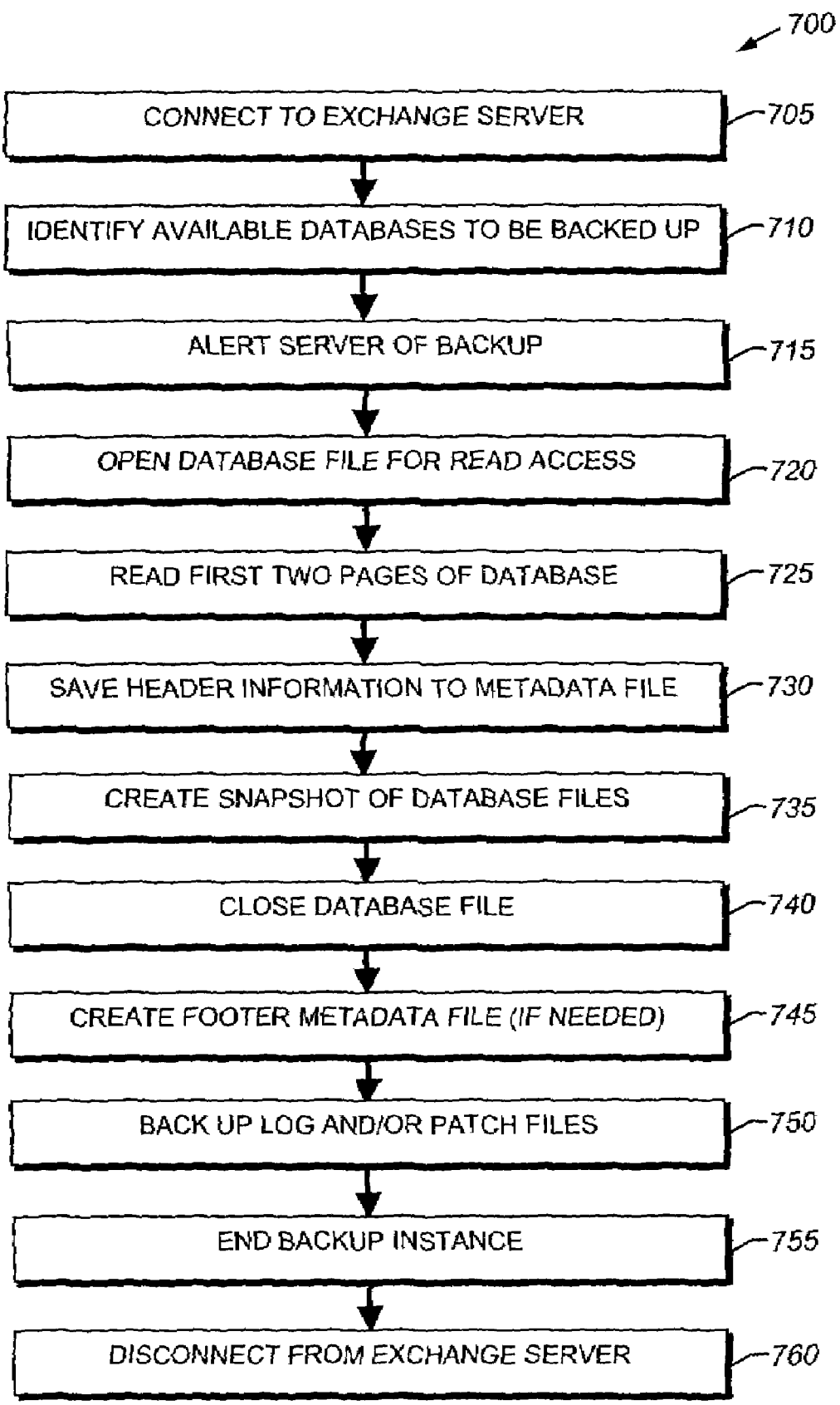
FIG. 7 is a flowchart detailing the procedure for performing a backup in accordance with an embodiment of the present inventions.

The steps of a backup procedure 700 in accordance with the present invention are shown in the flowchart of FIG. 7. Initially, in step 705, the backup agent connects to the Exchange server. This connection can be established using well-known and conventional application program interfaces (API) operating over conventional Internet or other networking connections with the Exchange server. The backup agent then, in step 710, identifies the available databases from which backup copies may be generated. The is backup agent may identify these databases by, for example, utilizing an API call to the database server that returns a listing of the available databases serviced by the database server.

After the backup agent has identified the database to be backed-up, the backup agent then, in step 715, alerts the Exchanger server of the commencing of a backup operation. The backup agent will identify the type of backup to be performed (e.g., full or partial) and which instance of the database to be backed-up.

The backup agent then opens the database file for read access in step 720. After opening the database file, the backup agent then reads the first two pages of the database (step 725). In the exemplary embodiment of an Exchange 2000 database server, each page of the database comprises four kilobytes (KB) of data. Thus, by reading the first two pages, eight kilobytes of data are read. It should be noted that varying amounts of data can be read to accommodate other database systems. The first two pages of an Exchange database comprise the header information for use in making a hard recovery. Once the initial information has been read from the database, the backup agent then saves the header information in a metadata file in step 730. This metadata file, described further below, may be stored in a .hdr extension type file in a snapinfo directory associated with a snapshot to be generated. The name of the .hdr file is the same as the database being backed up. Thus, the .hdr file associated with a given backed up database may be easily located and correlated. The exemplary .hdr file is basically a dump (i.e. a direct copy of the data bits) of the contents of the header data structure to a file stored on disk. It should be noted that in alternate embodiments, various forms of database identification information, other than header metadata, may be saved in accordance with the teachings of the present invention. Once the header file has been saved, then, in step 735, the backup agent uses a remote procedure call to generate a snapshot of the database file. In alternate embodiments, other methods may be used to generate the snapshot of the database file.

The database file is then closed (step 740). If, in the exemplary embodiment, the database server (Exchange 2000) is utilizing Service Pack 2 or higher, then the backup agent generates a footer metadata file in step 745. This footer file is generated from data stored in the header file and the information stored in logs created during the backup process. In the illustrative embodiment, the footer information is appended to the .hdr file generated in step 730. However, in alternate embodiments, the footer file information may be stored in a separate .hdr or .ftr extension type file. The .ftr file would again, similar to the .hdr file be named the same as the associated backup. The associated log and/or patch files (if running Exchange 2000 pre-Service Pack 2) are then backed up, step 750. These log/patch files are copied to the appropriate snapinfo directory. Next, the backup agent ends the backup instance (step 755) and then disconnects from the Exchange server (step 760). These can be accomplished using conventional Exchange APIs.

Figure 8:
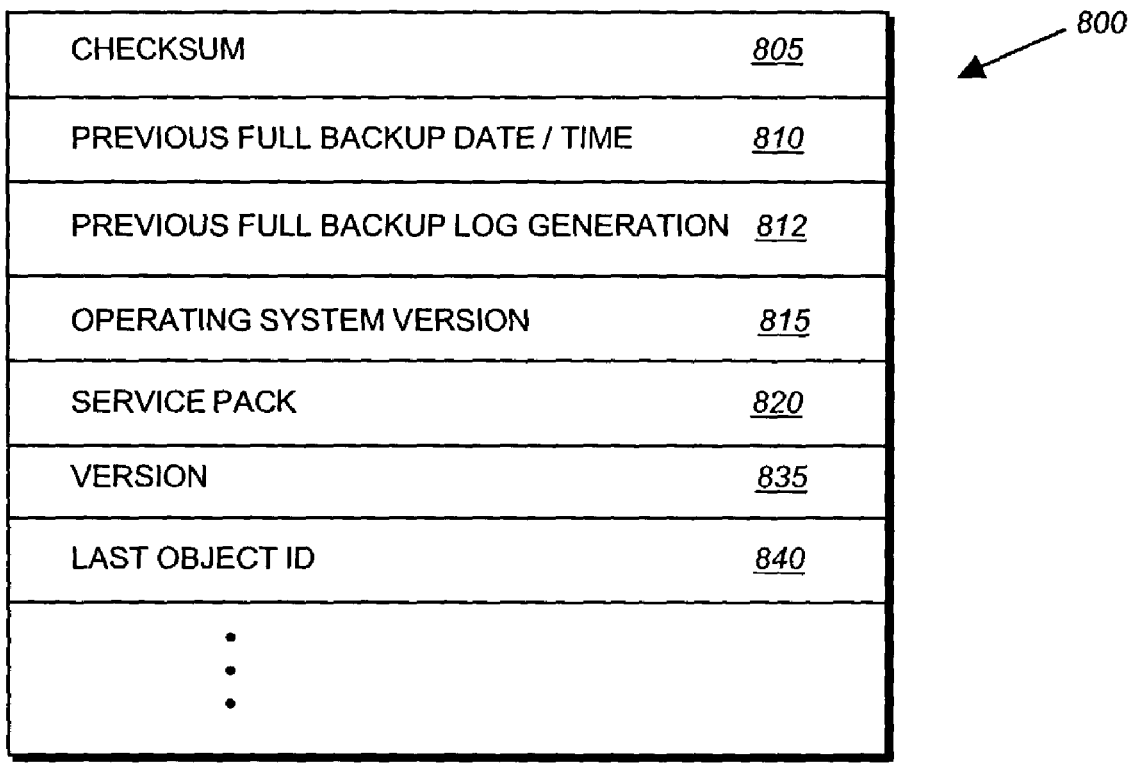
FIG. 8 is a schematic block diagram of an exemplary header data structure in accordance with an embodiment of the present invention.

In the illustrative embodiment, the Microsoft Exchange database server uses the header metadata for storing various bits of information relating to the database. This data is stored, in the exemplary embodiment, in the first two pages of the database file. An illustrative header data structure 800 is shown in FIG. 8. The header data structure 800 contains various metadata associated with the database file. This Exchange 2000 database metadata is further described in Microsoft Knowledge Base Article Q296788, entitled *XADM: Offline Backup and Restoration Procedures for Exchange* 2000 *Server*, and available on the World Wide Web at support.microsoft.com, the contents of which are hereby incorporated herein.

The header data structure 800 comprises a number of fields including, for example, a checksum field 805, a previous full backup date/time field 810, a previous full backup generation field 812, an operating system version field 815, a service pack field 820, a version field 835 and a last object identifier field 840. The checksum field 805 stores a checksum relating to the header information to be used to ensure that the data contained herein has not been corrupted. The date/time field 810 identifies the last time that a full backup of the database was generated. This information can be used for scheduling backups, for example to generate a backup after 10 days from the last full backup. The previous full backup log generation field 812, combined with the previous full backup date/time field 810, is used for verifying the snapshot image of the database with the metadata files saved during the backup procedure. The operating system version field 815 and service pack field 820 identify, respectively, the version of the operating system that the database server is executing upon and any service packs applied to the database server. Similarly, the version field 835 identifies the version of the database management system that is managing the database.

Figure 9:
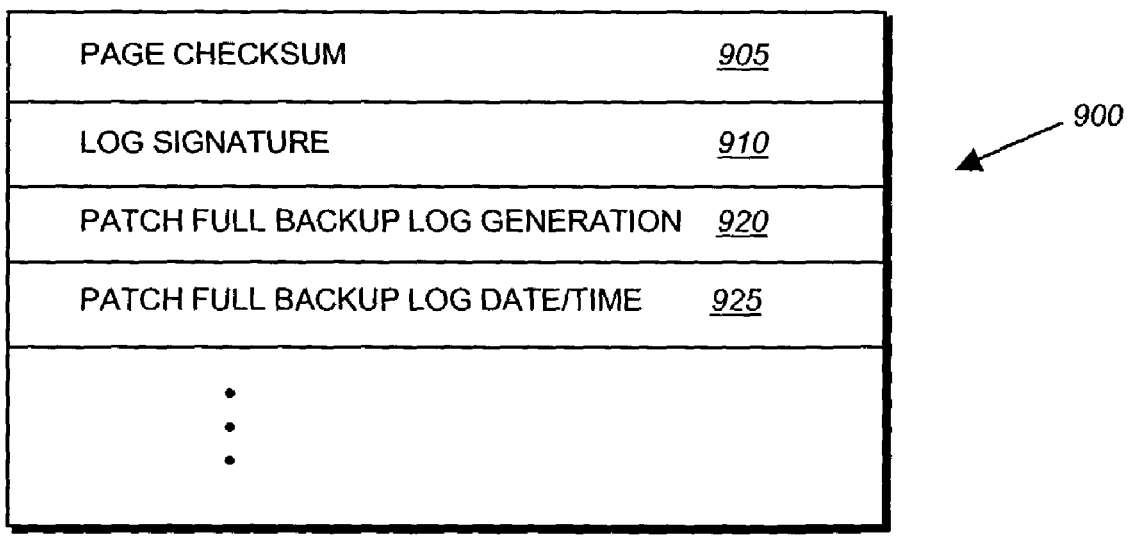
FIG. 9 is a schematic block diagram of an exemplary footer structure in accordance with an embodiment of the present invention.

An exemplary footer data structure 900 is shown in FIG. 9. The footer data structure 900, similarly to the header data structure, also contains various metadata associated with the database file. In an illustrative embodiment, the footer data structure 900 includes various fields, including a page checksum field 905, a log signature field 910, a database signature field 915, patch full backup log generation field 920 and patch full backup date/time field 925. Additional fields may also be utilized with the footer data structure.

Thus, in preparing a backup for use in a later hard recovery procedure, a backup agent retrieves a set of metadata from the header of the database. This metadata is then stored in a backup file for later use during the hard recovery process. In the exemplary embodiment of an Exchanger 2000 database, this header data comprises 8 kilobytes of data, or the first two pages of the Exchange database. After the header information is saved, the backup agent generates a snapshot of the database using conventional file system procedures. This snapshot of the database is later used for the hard recovery procedure. By utilizing this snapshotting feature, a backup of the database may be generated in seconds instead of hours normally required when using a tape drive as a storage medium. In certain embodiments, depending on the version of the database software being utilized, a footer file is also generated storing various metadata concerning the database including, e.g., patch log file information. This footer information may, in one embodiment, be appended to the header metadata file.

E. Hard Recovery

In the event of a corruption or other error condition concerning the database file, the data must be restored from a given backup.

Figure 10:
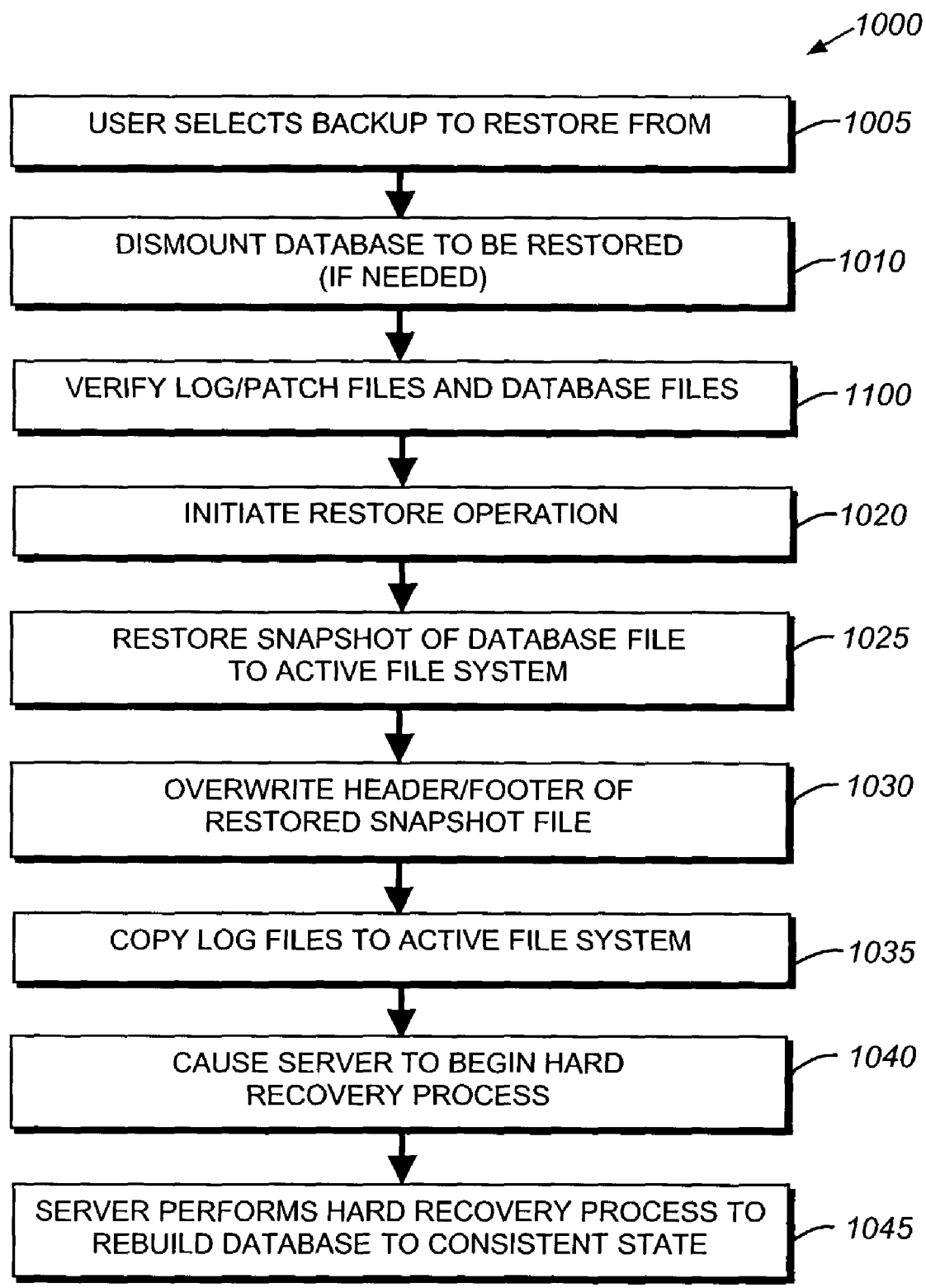
FIG. 10 is a flowchart detailing the steps of a procedure for performing an on-line hard recovery in accordance with an embodiment of the present invention.

The steps of an exemplary hard recovery procedure 1000 are shown in FIG. 10. The hard recovery procedure begins when, in step 1005, a user selects a backup to restore from. This can be accomplished by, for example, selecting an entry from a graphical user interface or entering a command-by-command line interface. Next, in step 1010, the database to be restored is dismounted if needed. This is accomplished by the backup agent issuing commands via an application program interface (API) to the Exchange 2000 server. By "dismount" it is meant that the particular database is taken offline so that data write operations are no longer directed to the database. In the example of an Exchange 2000 database, by dismounting a database, the information storage capabilities to a particular storage group are not stopped unless the database that is dismounted is the only database within the storage group. In other words, this illustrative embodiment enables the other unaffected databases to continue normal operation and service requests.

The backup agent then verifies the log and/or the patch files in step 1100. After this verification, described further below, the backup agent then initiates the restore operation, in step 1020, by issuing the appropriate API calls to the Exchange server. Next, in step 1025, the snapshot of the database files is restored to the active file system. This may be accomplished by using known snapshot restoration techniques including the method described in U.S. patent application Ser. No. 10/100, 948, entitled SYSTEM AND METHOD FOR RESTORING A SINGLE FILE FROM A SNAPSHOT, by Raymond C. Chen et al., the contents of which are hereby incorporated by reference.

Next, in step 1030, the header and/or footer of the restored database snapshot file is overwritten with the metadata stored in the .hdr and/or .ftr files. By overwriting the header and footer of the database file, the database is converted into a backup version suitable for a hard recovery operation. Then, in step 1035, the backup agent copies the log files from the snapinfo directory to the active file system. In the exemplary embodiment, the log files, which were stored in the snapinfo directory, are copied to the appropriate locations with the active file system. The backup agent then causes the database server to begin a hard recovery process (step 1040). This can be accomplished by using a conventional API command. Finally, in step 1045, the database server performs a hard recovery process to rebuild the database to a fully consistent state. This hard recovery process includes replaying any logs and/or patch files to bring the database to a fully consistent state as of the time the backup was generated.

The database server's hard recovery process will rebuild the database files to a consistent state. Once the database server has completed the reconstruction of the database files, the database may then be remounted and utilized for data write operations.

One important aspect of the restoration process is the verification of the log, patch and database files (step 1100 from FIG. 10). This verification ensures that the appropriate log/patch files and database files are available and have not been corrupted. Specifically, the verification ensures that all of the log files are present and that none have been corrupted. It should be noted that other forms of verification procedures may be utilized in accordance with the teachings of the present invention.

Figure 11:
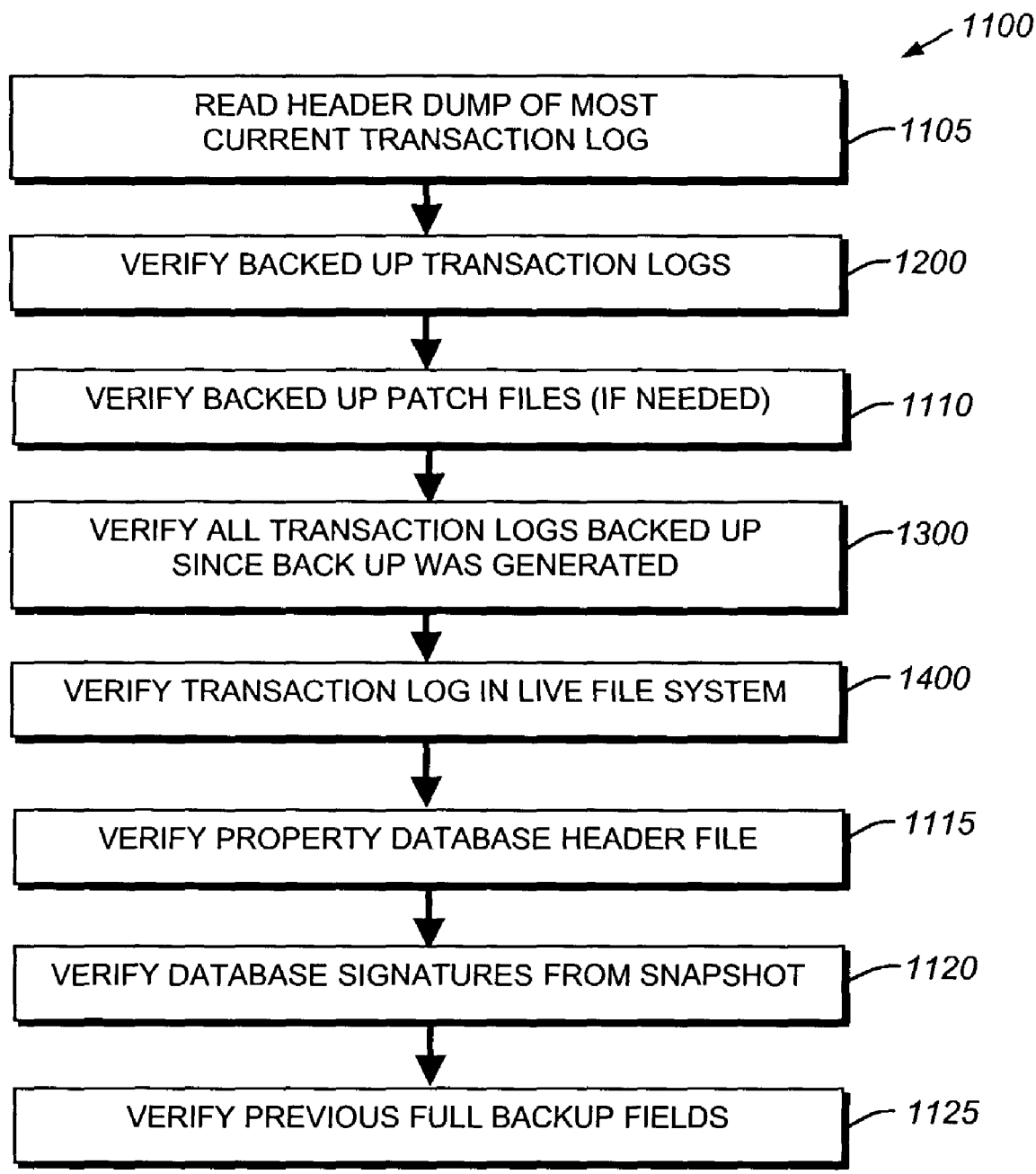
FIG. 11 is a flowchart detailing the steps of a procedure for verifying log files in accordance with an embodiment of the present invention.

The steps of an exemplary verification procedure 1100 is shown in FIG. 11. Initially, in step 1105, the verification procedure reads the header dump file of the most current transaction log. The header dump file has a header information concerning the transaction log, similar to the header information associated with a database file. Next, in step 1200, the procedure verifies the backed up transaction logs by dumping the log headers. This verification of the backed up transaction logs by dumping the headers ensures that the transaction logs stored in the snapinfo directory associated with the backup to be restored from are consistent and in a proper ordering. Next, in step 1110, the appropriate patch files are verified. Patch files will only exist if, for example, the database server is a Microsoft Exchange 2000 server executing a pre-Service Pack 2 version of Microsoft Exchange.

Next, in step 1300, all of the transaction logs backed-up since the subject backup are verified. After the transaction logs have been verified, then, in step 1400, the transaction logs in the live or active file system are verified. The header file for the database is then verified in step 1115. This verification of the header file also includes, in an alternate embodiment, verification of the footer file if such a file was created. This verification occurs by, for example, reading all recorded property database files header dumps from the appropriate snapinfo directory. Once all the database header files have been identified, the procedure then verifies that the last header file generated has the same database signature as those previously made concerning this database.

Next, in step 1120, the database signatures are verified beginning with the one containing the snapshot. And finally, in step 1125, the procedure verifies the previous full backup fields in the snapshot and database header files. This is accomplished by, for example ensuring that the previous full backup field in each header file is the same as the previous full backup field in the associated snapshot.

Figure 12:
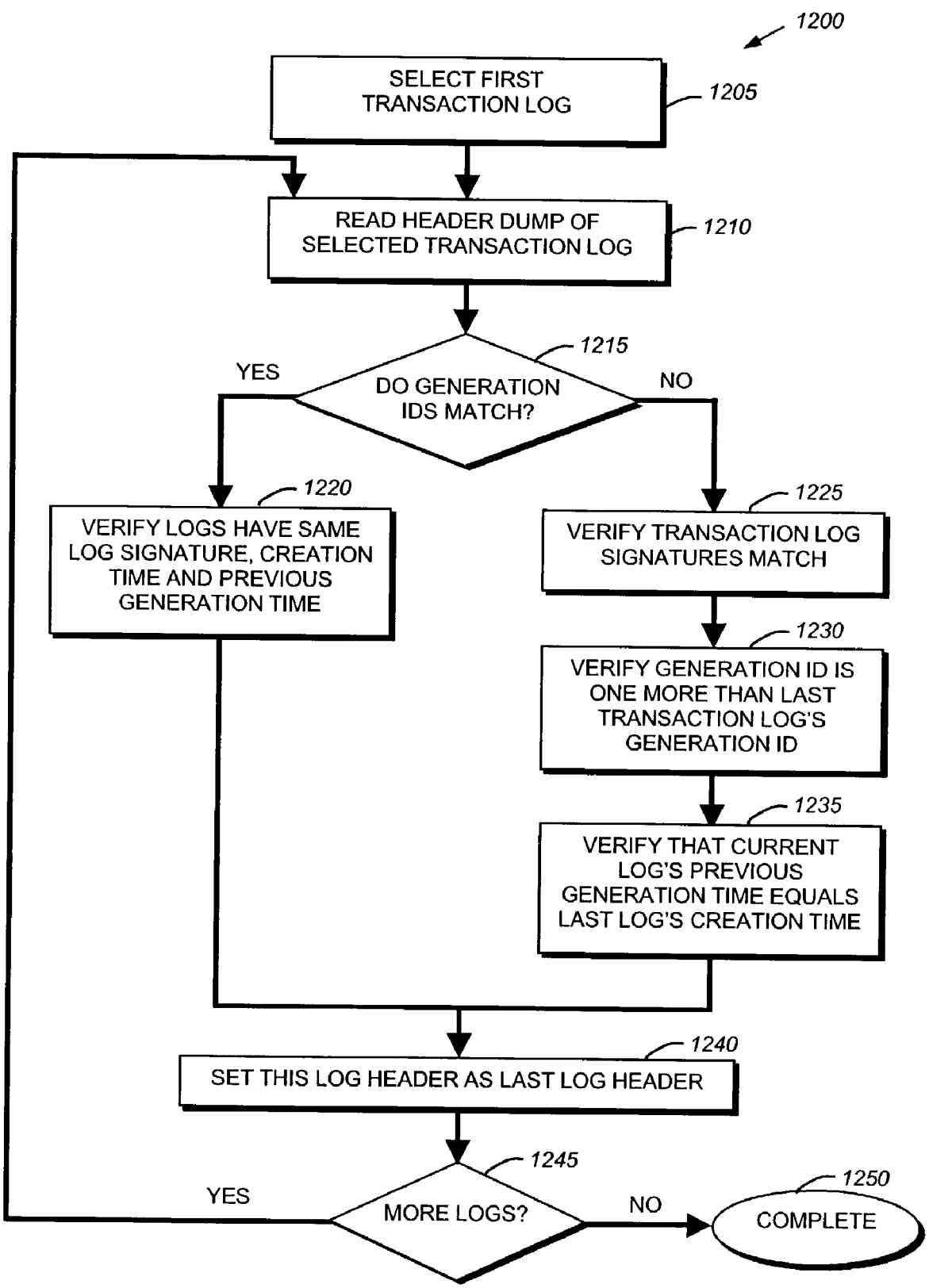
FIG. 12 is a flowchart detailing the steps of a procedure for verifying backed up transaction logs in accordance with an embodiment of the present invention.

The procedure for verifying backed up transaction logs by dumping the headers is shown on FIG. 12. The procedure begins by, in step 1205, selecting a first transaction log. The associated header dump of the selected transaction log is then read in step 1210. Next, in step 1215, determine if the generation IDs of this transaction log matches the last transaction log's generation ID. If the generation IDs match, then, in step 1220, verify that the logs have the same log signature, creation time and previous generation time.

If the generation IDs do not match, then, in step 1225, the procedure verifies that the transaction log signatures are the same. Next, in step 1230, the procedure verifies the generation ID of the selected transaction log is one more than the last transaction log's generation ID. Additionally, in step 1235, the procedure verifies that the last log's creation time equals the current log's previous generation time.

Either after step 1220 or 1235, the procedure continues to step 1240 where the selected log header is set as the last log header. Next, in step 1245, the procedure determines if more logs exist that require verification. If no logs need to be verified, then the procedure is complete (step 1250). Otherwise the procedure loops back to step 1210 after selecting the next log to verify.

Figure 13:
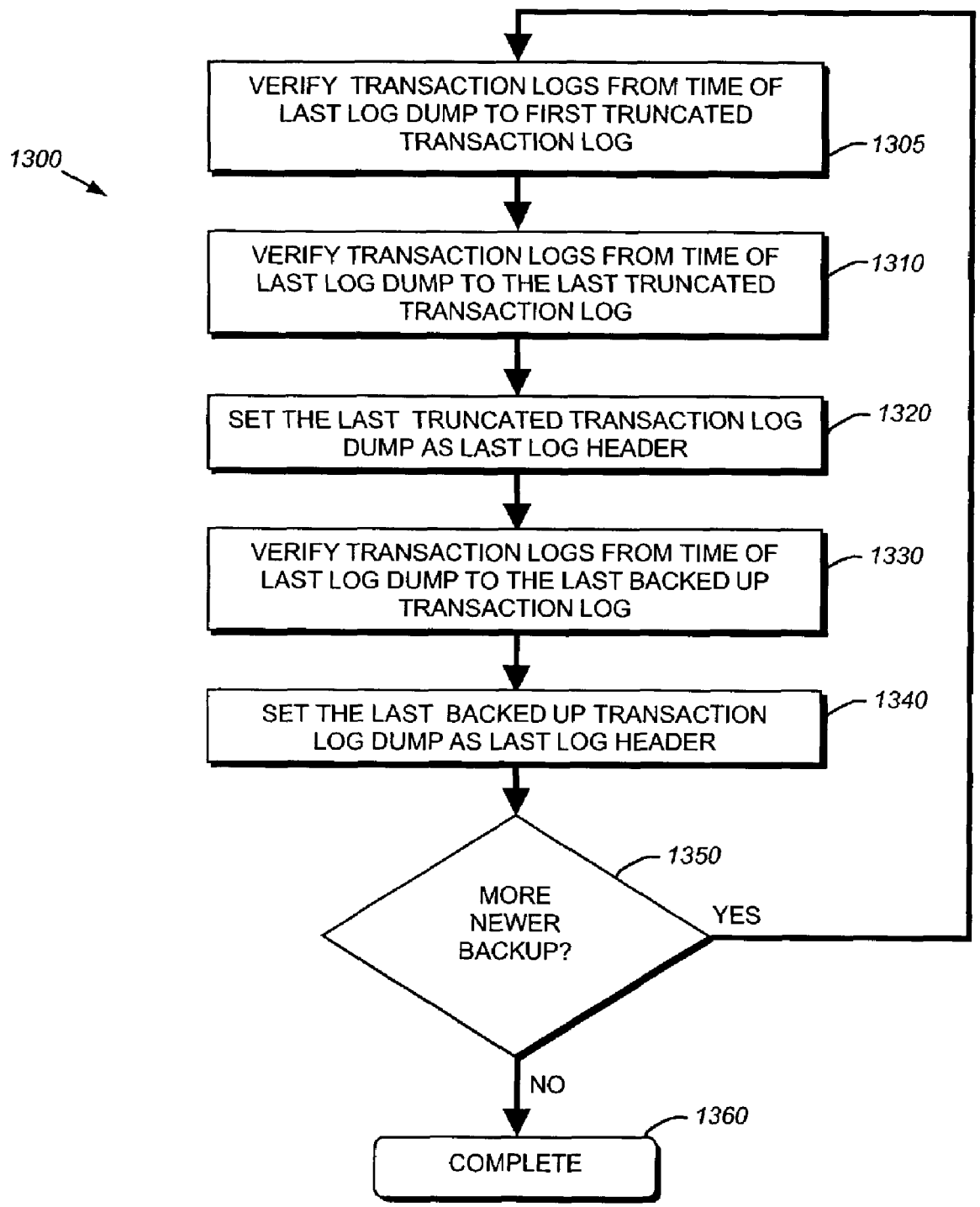
FIG. 13 is a flowchart detailing the steps of a procedure for verifying transaction logs backed up since the given a particular backup was generated.

FIG. 13 is a flowchart of a procedure 1300 for verifying all transaction logs backed up since the selected backup. The procedure begins, in step 1305, by verifying transaction logs from the time of the last log dump until the first truncated transaction log. This procedure verifies that all of the transaction log signatures are the same and that each transaction log generation ID is one less than the previous one. Additionally, this ensures that each transaction logs' creation time is equal to the previous one's previous generation time. Next, in step 1310, all of the logs from the time of the last log dump to the last truncated transaction log are verified. A transition log is truncated by the database server to reduce the size of the logical log. This occurs when older log records are no longer needed for recovering a database. Then, in step 1320, the last truncated transaction log dump is set to be equal to the last log header. All backed up truncation logs from the adjusted last log dump (step 1320) to the last backed up truncation logs are verified (step 1330). This verification ensures that all transaction logs' signature are the same, that the generation ID of each transaction log is one more than the last transaction log's generation ID, and that each log's previous generation time equals the previous log's creation time. Then, in step 1340, the last backed up transaction log dump is set equal to the last log header. In step 1350, if there are more backups that were created after this backup, the procedure loops back to step 1305. If there is not a newer backup, then the procedure is complete (step 1360)

Figure 14:
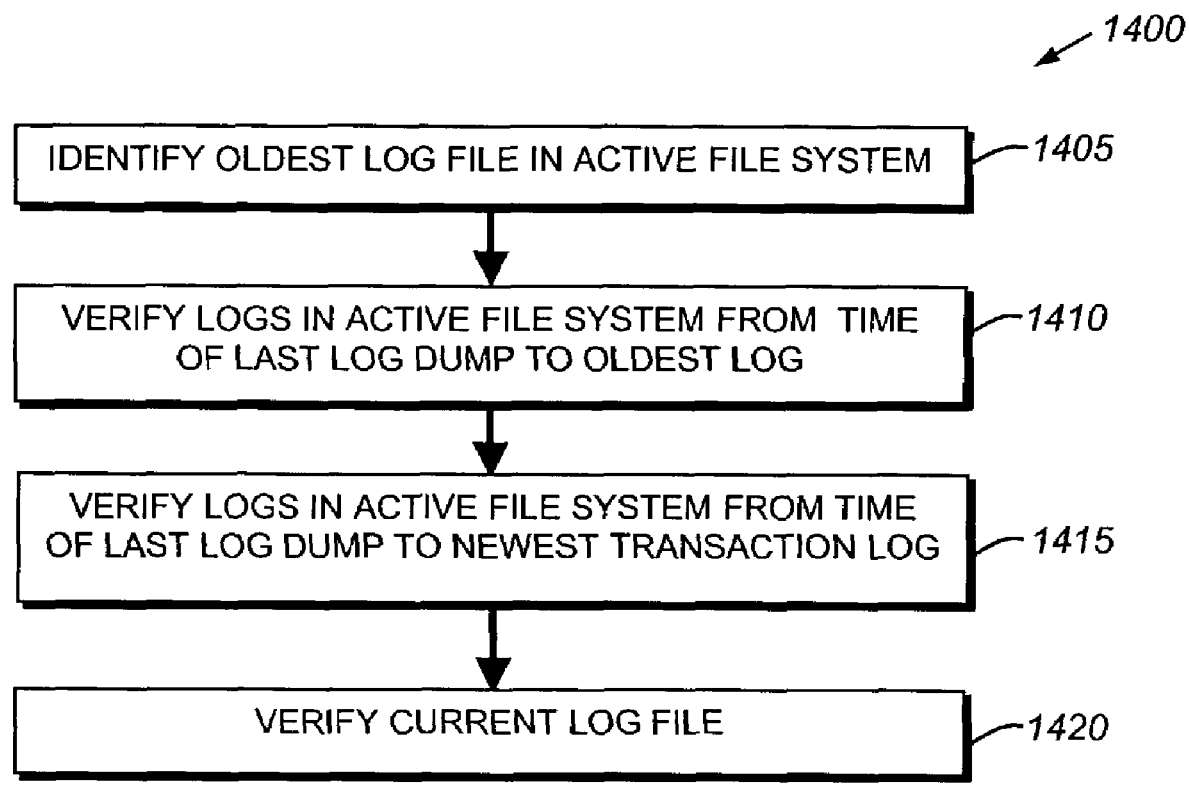
FIG. 14 is a flowchart detailing the steps of a procedure for verifying transaction logs in the live file system.

FIG. 14 is a flowchart detailing the steps of a procedure 1400 for verifying transaction logs in a live file system. The procedure begins in step 1405, where the oldest log file in the active file system is identified. Then, in step 1410, all of the logs in the active or live file system are verified from the time of the last log dump to the oldest log. This procedure verifies that all the transaction log signatures are the same and that each transaction log generation ID is one less than the previous one. Additionally, this ensures that each transaction log's creation time is equal to the previous one's previous generation time. Next, in step 1415, all the logs in the active file system are from the time of the last log dump to the newest transaction log, are verified. Finally, in step 1420, the current log file is verified. This verification occurs by ensuring that the transaction log's signature of the current log file is the same as the transaction log signature of the prior log's. Additionally, the log generation for the current log file is checked to determine that it is one more than the generation of the last log dump and that the previous generation time for the current log file is equal to the creation time of the last log dump.

To again summarize, the present invention provides a system and method for performing a hard recovery of a database by generating a snapshotted backup of the database and associated log/patch files. In generating the appropriate backup, a header file is generated that contains the header and/or footer metadata associated with a given database. This header file is written in a snapinfo directory associated with the snapshot of the database. A snapshot of the database files is generated. Additionally, the log and/or patch files associated with a given database are copied to the snapinfo directory.

Upon the initiation of a hard recovery, the database files are restored from a snapshot. The header and/or footer metadata is overwritten to the restored files using the data contained in the header files. The log and/or patch files are copied and verified from the snapinfo directory. During the log file verification, the log files are checked for consistency and to ensure that none have been corrupted. Finally, the Microsoft Exchange server is then initialized to perform a hard recovery backup. The Exchange server utilizes the restored database files with modified metadata to generate a restored and consistent database.

The foregoing has been a detailed description of an illustrative embodiment of the invention. Various modifications and additions can be made without departing from the spirit and scope of the invention. It is understood that other database servers and database files can be utilized in accordance with the teachings of this invention while remaining within the scope of the present invention. In addition, while this reference has been written with reference to the Microsoft® Exchange server and file servers the principles are equally pertinent to all types of database systems and computers, including stand-alone computers. In addition, it is specifically contemplated that the teachings of this invention can be applied to other versions of Exchange that are not inherently disadvantaged with respect to remote backup to file servers. Additionally, the database identification information may be implemented in forms other than a header and footer metadata file in accordance with various embodiments of the present invention. Further, it is expressly contemplated that the teachings of this invention can be implemented as software, including a computer-readable medium having program instructions executing on a computer, hardware, firmware, or a combination thereof. Accordingly this description is to only be taken by way of example and not to otherwise limit the scope of the invention.

What is claimed is:

1. A computer implemented method for generating a backup of a database, comprising:
   maintaining the database on a file system executed on a file server;
   storing header information in a backup file of the file server, wherein the header information contains metadata associated with the database;
   storing footer information in the backup file of the file server, wherein the footer information comprises database identification information associated with the database and is generated from the header information;
   creating a snapshot of the database;
   incurring an error condition at the database that requires performance of a hard recovery operation by the file server;
   in response to incurring the error condition, verifying log files associated with the database to ensure that all of the log files are present and not corrupted;
   restoring the snapshot of the database to form a restored database;
   overwriting a header of the restored database with the header information in the backup file to permit the hard recovery operation;
   overwriting a footer of the restored database with the footer information in the backup file to permit the hard recovery operation;
   copying the verified log files to the file system; and
   performing the hard recovery operation to replay the verified log files in the file system and rebuild the restored database to a fully consistent state.

2. The method of claim 1, wherein the metadata of the header information identifies the database.

3. The method of claim 1 wherein the file system is an active file system.

4. An apparatus for generating a backup of a database, comprising:
   means for maintaining the database on a file system executed on a file server;
   means for storing header information in a backup file of the file server, wherein the header information contains metadata associated with the database;
   means for storing footer information in the backup file of the file server, wherein the footer information comprises database identification information associated with the database and is generated from the header information;
   means for creating a snapshot of the database;
   means for incurring an error condition at the database that requires performance of a hard recovery operation by the file server;
   means for verifying log files associated with the database to ensure that all of the log files are present and not corrupted, in response to incurring the error condition;
   means for restoring the snapshot of the database to form a restored database;
   means for overwriting a header of the restored database with the header information in the backup file to permit the hard recover operation;
   means for overwriting a footer of the restored database with the footer information in the backup file to permit the hard recovery operation;
   means for copying the verified log files to the file system; and
   means for performing a hard recovery operation to replay the verified log files in the file system and rebuild the restored database to a fully consistent state.

5. The apparatus of claim 4, wherein the metadata of the header information identifies the database.

6. The apparatus of claim 4 wherein the file system is an active file system.

7. A system for generating a backup of a database, comprising:
   a file system executed on a file server to maintain the database;
   a backup file of the filer server to store header information, wherein the header information contains metadata associated with the database;
   the backup file of the file server to store footer information, wherein the footer information comprises database identification information associated with the database and is generated from the header information;
   a persistent consistency point image (PCPI) manager to create a snapshot of the database
   an error condition incurred by the database that requires performance of a hard recovery operation by the file server;

in response to the error condition, a processor of the file server to verify log files associated with the database to ensure that all of the log files are present and not corrupted;

the processor of the file server to restore the snapshot of the database to form a restored database;

the processor of the file server to overwrite a header of the restored database with the header information in the backup file to permit the hard recover operation;

the processor of the file server to overwrite a footer of the restored database with the footer information in the backup file to permit the hard recovery operation;

the processor of the file server to copy the verified log files to the file system; and the processor of the file server to perform a hard recovery operation to replay the log files in the file system and rebuild the restored database to a fully consistent state.

8. The system of claim 7, wherein the metadata of the header information identifies the database.

9. A computer readable storage medium containing program instructions executed by a processor, comprising:

program instructions that maintain a database on a file system executed by a file server;

program instructions that store header information in a backup file of the file server, wherein the header information contains metadata associated with the database;

program instructions that store footer information in the backup file of the file server, wherein the footer information comprises database identification information associated with the database and is generated from the header information;

program instructions that create a snapshot of the database;

program instructions that incur an error condition at the database that requires performance of a hard recovery operation by the file server;

program instructions that verify log files to ensure that all of the log files are present and not corrupted, in response to the error condition at the database;

program instructions that restore the snapshot of the database to form a restored database;

program instructions that overwrite a header of the restored database with the header information in the backup file to permit the hard recovery operation;

program instructions that overwrite a footer of the restored database with the footer information to permit the hard recovery operation;

program instructions that copy the verified log files to the file system; and program instructions that perform the hard recovery operation to replay the verified log files in the file system and rebuild the restored database to a fully consistent state.

10. A computer implemented method for performing a hard recovery of a database, comprising:

maintaining the database on a file system executed on a file server;

storing header information in a backup file of the file server, wherein the header information contains metadata associated with the database;

storing footer information in the backup file of the file server, wherein the footer information comprises database identification information associated with the database and is generated from the header information;

creating a snapshot of the database;

incurring a error condition at the database;

restoring the snapshot of the database to form a restored snapshot;

overwriting a header of the restored database with the header information in the backup file;

overwriting a footer of the restored database with the footer information in the backup file; and performing the hard recovery operation to replay log files in the file system and rebuild the restored database to a fully consistent state.

11. The method of claim 10, further comprising:

verifying the log files.

12. The method of claim 11, wherein the step of verifying the log files further comprises:

verifying transaction by log header dumps;

verifying transaction logs backed up after a given backup was generated;

verifying transaction logs in the file system;

verifying a metadata file associated with the database; and verifying database signatures by checking that header information associated with a set of pointers created during the snapshot is the same as header information associated with a previous full backup field.

13. The method of claim 10, wherein the metadata of the header information identifies the database.

14. An apparatus for performing a hard recovery of a database, comprising:

means for maintaining the database on a file system of the filer server;

means for storing header information in a backup file of the file server, wherein the header information contains metadata associated with the database;

means for storing footer information in the backup file of the file server, wherein the footer information comprises database identification information associated with the database and is generated form the header information;

means for creating a snapshot of the database;

means for incurring a error condition at the database;

means for restoring the snapshot of the database to form a restored snapshot;

means for overwriting a header of the restored database with the header information in the backup file;

means for overwriting a footer of the restored database with the footer information in the backup file; and means for performing the hard recovery operation to replay log files in the file system and rebuild the restored database to a fully consistent state.

15. The apparatus of claim 14, further comprising:

means for verifying the log files.

16. The apparatus of claim 15, wherein the means for verifying the log files further comprises:

means for verifying transaction by log header dumps;

means for verifying transaction logs backed up after a given backup was generated;

means for verifying transaction logs in the file system;

means for verifying a metadata file associated with the database; and means for verifying database signatures by checking header information associated with a set of pointers created during the snapshot is the same as header information associated with a previous full backup field.

17. The apparatus of claim 14, wherein the metadata of header information identifies the database.

18. A computer readable storage medium containing executable program instructions executed by a processor, comprising:

program instructions that maintain a database on a file system executed on a server;

program instructions that store header information in a backup file of the file server, wherein the header information contains metadata associated with the database;

program instructions that store footer information in the backup file of the file server, wherein the footer information comprises database identification information associated with the database and is generated from the header information;

program instructions that create a snapshot of the database;

program instructions that incur an error condition at the database;

program instruction that restore the snapshot of the database to form a restored database;

program instructions that overwrite a header of the restored database with the header information in the backup file;

program instructions that overwrite a footer of the restored database with the footer information in the backup file; and program instructions that perform a hard recovery operation to replay log files in the file system and rebuild the restored database to a fully consistent state.

19. A computer implemented database, comprising:

a file system executed on file server to maintain the computer implemented database;

a backup file of the file server to store header information, wherein the header information contains metadata associated with the database;

the backup file of the file server to store footer information, wherein the footer information comprises database identification information associated with the database and is generated from the header information;

a snapshot to be created of the database;

the database to incur an error condition;

a processor of the file server to restore the snapshot of the database to form a restored database;

the processor of the file server to overwrite a header of the restored database with the header information in the backup file;

the processor of the file server to overwrite a footer of the restored database with the footer information in the backup file; and the processor of the file server to perform a hard recovery operation to replay log files in the file system and rebuild the restored database to a fully consistent state.

* * * * *